May 7, 1957 A. NAGY 2,791,211
DIAMOND DRESSING TOOLS
Filed June 2, 1955 2 Sheets-Sheet 1

United States Patent Office 2,791,211
Patented May 7, 1957

2,791,211

DIAMOND DRESSING TOOLS

Arpad Nagy, London, England

Application June 2, 1955, Serial No. 512,819

Claims priority, application Great Britain June 9, 1954

10 Claims. (Cl. 125—11)

Diamond tipped tools for dressing and trueing grinding wheels may embody a rough natural diamond having no particular crystallographic shape, or of recognisable crystallographic shape, such as a cube, an octahedron or a dodecahedron, or they may use a diamond which has been polished to the form of a pyramid having sharp cutting edges.

It is necessary to index the diamond from time to time so as to present fresh cutting surfaces to the grinding wheel and the existing practice is to index in such fashion that the flats which are formed in succession on the diamond by its contact with the wheel are replaced by edges formed by the intersection of two such flats. To achieve this it is necessary to rotate the diamond at each indexing operation through an angle which is not a sub-multiple of 360°. For instance seven equi-spaced indexing positions have been used in a cycle of two turns of a rough diamond with the result that, neglecting fractions of a degree, the indexing positions are situated at 0, 103, 206, 309, 412, 514, 617 and 0°. If, for example, the diamond has four directions of soft grain at 45, 135, 225, and 315°, three of the seven indexing positions, namely those at 206, 309 and 412° (i. e. 52°) are nearer the soft than the hard grain.

The present invention is based on the appreciation of the fact that it is preferable to index the diamond so that it is working at all the index positions at or near directions of hard grain, notwithstanding the fact that operation in this fashion involves presenting flats instead of edges to the grinding wheel.

The invention accordingly provides a diamond tipped tool for dressing and trueing grinding wheels which includes indexing mechanism for presenting the diamond to the work in successive positions all of which are at or in close proximity to its directions of hard grain.

It is practicable to present the diamond to the work exactly along its directions of hard grain, in which case there will be 2, 3 or 4 indexing positions according as to whether the diamond has 2, 3 or 4 directions of hard grain. For reasons explained later, however, I prefer to index the diamond so that there are two indexing positions disposed at a small angle (e. g. 15°) on opposite sides of each direction of hard grain. If desired, however, I may in addition use further indexing positions disposed exactly in the directions of maximum hardness.

Figure 7:
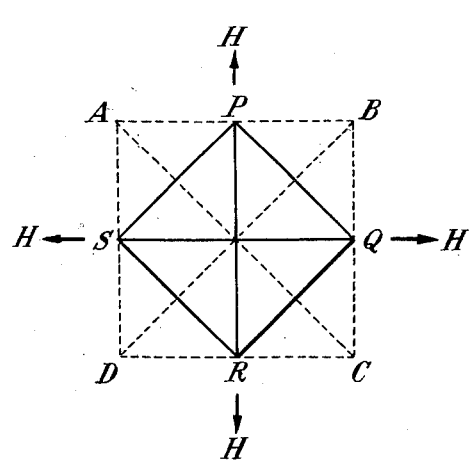

The directions of hard grain in a natural octahedral diamond crystal extend parallel to the sides of the base square and if such a crystal is indexed so that the sides of the base square are brought in succession into a position parallel to the axis of rotation of the grinding wheel the cutting will be performed in the directions of hard grain by the triangular faces of the octahedron and not by its natural edges. I prefer, in order to increase the cutting efficiency, to polish a pyramid on a corner of the octahedron, the base square of which is displaced by 45° around the axis of the dresser in relation to the base square of the original crystal. This is illustrated in Fig. 7 of the accompanying drawings in which ABCD represents the base square of the original crystal and PQRS the base square of the polished pyramid, H—H and H—H representing the directions of hardest grain. This pyramid may be produced by a modification of the technique described in British specification No. 655,720 according to which a diamond dressing tool is provided with a multiplicity of pyramidal points by production on the surface of the diamond, by profile grinding, of two sets of parallel V-section grooves intersecting one another at right angles.

The diamond may be provided with a single pyramid point by a lap with wider V-grooves, to which the diamond is presented so that it is polished by the lap in succession in two directions at right angles. If the grooves in the lap are sufficiently wide, the first cutting operation will produce a V-section ridge on the diamond, and the second cutting operation will convert the ridge into a single pyramid. The diamond is presented to the lap so that the latter cuts the diamond in the directions of minimum abrasion resistance, i. e. the directions AC and BD in Fig. 7, and the edges of the pyramid will consequently extend in the directions PR and SQ of maximum abrasion resistance. Preferably the sides of the V-groove in the lap are concave and not flat, with the result that the pyramid formed on the diamond will be domed and have four convex cutting edges extending, as already stated, in the directions of maximum hardness of the diamond. The loss of diamond material during the operation of forming the pyramid on the diamond is then reduced to a minimum. Also the curved pyramid has greater strength than a pyramid with plane faces and of the same base and height, and there is less tendency for its point to chip off. This is important because the tip is very sensitive when the diamond is first put into use.

Figure 1:
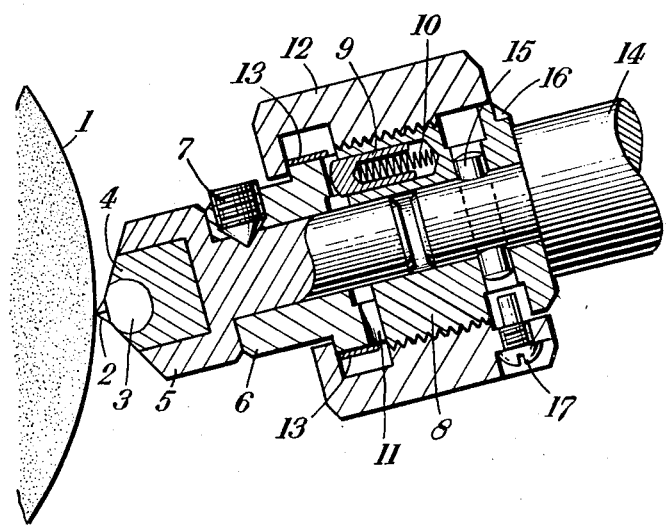
Figure 2:
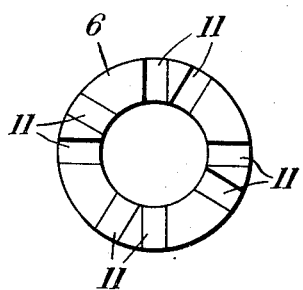
Figure 3:
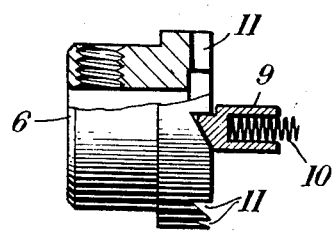
Figure 4:
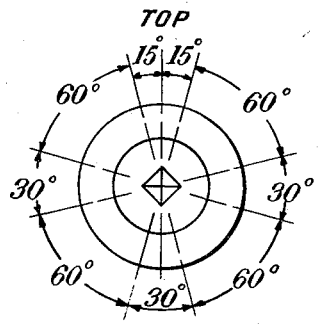
Figure 5:
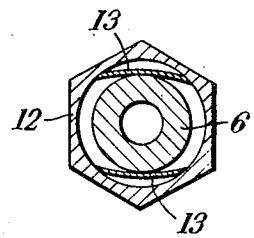
Figure 6:
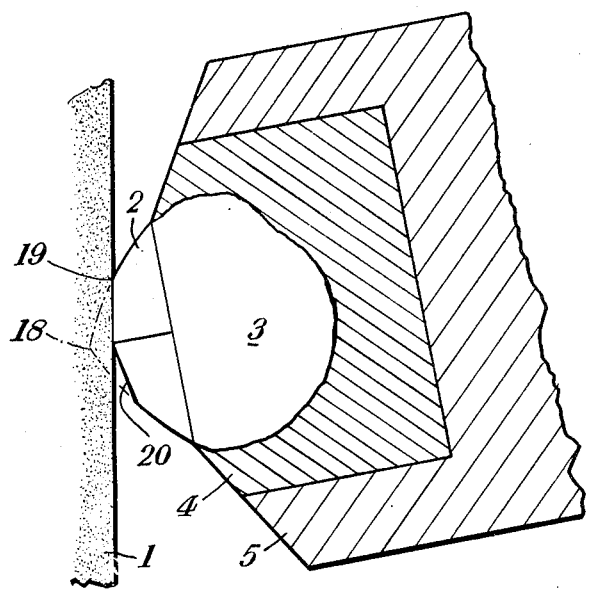
Figure 8:
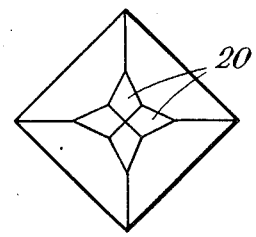
Figure 9:
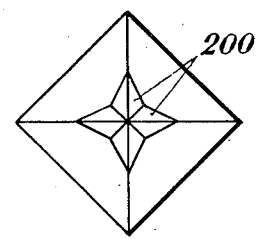

The invention will now be described in more detail, with reference to the accompanying drawings which illustrate its application to a diamond polished with a pyramid having four directions of maximum hardness extending in the directions of its edges. In the drawings:

Fig. 1 is an enlarged longitudinal section through a diamond dressing tool according to the invention, Fig. 2 is an end elevation of the ratchet member, Fig. 3 is a side elevation, partly in section, of the ratchet member, Fig. 4 is a diagram showing the indexing positions, Fig. 5 is a section on a smaller scale through the clutch, Fig. 6 is a section on a larger scale through the end of the diamond bit, Fig. 7 is an end view of the polished pyramid of the diamond in its new and unworn condition, and Figs. 8 and 9 are similar views showing the pyramid after wear when having been indexed to 4 and 8 positions respectively.

In Figs. 1 and 6, 1 represents the grinding wheel, to which is presented the polishing pyramid 2 of a diamond 3 held in a sintered matrix 4 which is brazed into a diamond bit 5. As will be seen the point of the diamond is on the centre line of the bit. In use of the tool the axis of the diamond is at right angles to the axis of rotation of the grinding wheel but is inclined at about 15° to the radius of the grinding wheel.

As indicated in Fig. 6, which is drawn on such a large scale that the edge of the wheel 1 appears to be straight, the diamond has convex cutting edges which intersect at the point of the pyramid, the angle between the tangents to the two edges shown at the point being from 143° to 151°.

To take advantage of the hard grain of the diamond, the latter may be indexed through 90° so as to present the edges of the pyramid in succession to the grinding wheel. As the result of this, however, the initial sharp point 18 of the diamond will be worn down to produce flats 20 (Figs. 6 and 8) on the edges of the pyramid, the diamond cutting after wear has occurred at the point 19 (Fig. 6) on its upper edge. These flats will in fact be slightly concave but owing to the large size of the grinding wheel in relation to the diamond they can for all practicable purposes be regarded as true flats. The larger these flats become, the greater is the tendency for glazing to develop, i. e. for the spaces between the minute cutting edges of the grinding wheel to become filled up so obstructing the cutting effect.

With a view to reducing so far as possible the tendency for large flats to be worn on the pyramid, I propose indexing the diamond to an even number of unequally spaced indexing positions comprising four groups, each group consisting of two or more indexing positions disposed symmetrically in relation to one of the directions of maximum hardness of the diamond and disposed not more than about 15° from said direction. I find that, provided the diamond is presented to the work at a position not more than about 15° from the theoretically best, it still works basically on the hard grain in all positions of indexing while the flats formed, and indicated at 200 in Fig. 9, are smaller than the flats 20 (Fig. 6) formed when working direct on the four edges of the pyramid with consequent reduction of the risk of glazing. It will be noted that the four flats 20 (Fig. 8) extend over the edges of the pyramid while the eight flats 200 (Fig. 9) are divided into pairs, the flats of each pair being disposed on opposite sides of the edge of the pyramid.

Thus, the indexing positions may be located at 15° on each side of each edge of the diamond pyramid. Starting then from the first indexing position, the indexing steps will be 0°, 30°, 90°, 120°, 180°, 210° 270°, 300° and 0°; the 0° position being disposed 15° from an edge of the pyramid.

Indexing of the diamond may conveniently be effected, as will now be described with reference to Figs. 1–5, by means of a nut connected by a clutch to a ratchet member attached to the bit and engaging a threaded member fixed to the shank of the tool and carrying a detent for engaging notches in the ratchet member which define the indexing position. On unscrewing the nut, the clutch will turn the bit and ratchet member to force the detent out of its notch and bring another notch opposite to or past the detent. When the nut is turned in the reverse direction, the detent will engage the next notch and the clutch will slip to permit of tightening the nut.

The bit 5 is fixed to a ratchet member 6 by a grub screw 7 engaging a depression in the bit which is located so that the notches 11 in the ratchet piece, which define the indexing positions, are correctly positioned in relation to the edges of the pyramid 2. The shank of the bit 5 is long enough to act as a pilot in the bore of a screwed head 8 in order to centre the ratchet member 6 on the head 8. A hollow detent 9 in the head is pressed forward by a spring 10 to engage the ratchet notches 11. A pair of springs 13, disposed between the ratchet member 6 and a cap nut 12, engaging the thread on the head 8, act as a clutch between the nut 12 and the ratchet member 6. The springs 13 are placed flat in the bore of the cap nut 12, and when the ratchet piece is introduced from the rear into the cap nut chamfered edges on the ratchet piece cause the springs 13 to assume the bowed configuration shown in Fig. 5.

When the cap nut 12 is turned anticlockwise, as seen from the point of the tool, it will unscrew from the head 8 and the springs 13 will cause the ratchet piece, and therefore the diamond, to rotate with the cap nut, thereby forcing the detent 9 out of the notch 11. The cap nut is rotated until the next indexing position is reached or passed. On reverse, or clockwise, rotation of the cap nut the detent 9 will click into another notch 11 in the ratchet member, to arrest further rotation thereof, whereafter the springs 13 will slip to permit of tightening of the cap nut.

The shank 14 of the tool is held in the head 8 by a transverse pin 15. At the back of the head 8, behind the cap nut 12, is a centre punch mark 16 and the shank 14 must be clamped on the grinding machine with this mark on top. A screw 17 at the end of the cap nut 12 engages a recess in the head 8 and serves to limit the travel of the cap nut along the thread of the head. The indexing positions defined by the notches 11 are shown in Fig. 4. As will be seen, each is disposed at 15° from one of the edges of the pyramid.

Since the diamond embodies a pre-polished pyramid it is symmetrical in relation to the axis of indexing, and the successive cutting faces are brought automatically into working position as the result of indexing without new readings or new settings being required. This is a great advantage over existing dressers which embody a rough diamond which is asymmetric, with the result that after indexing the diamond may lose contact with the grinding wheel altogether or be positioned to take too deep a cut.

The above-described indexing mechanism may be used not only with a diamond possessing a single profiled pyramid but also, for the purpose of obtaining a particularly fine finish of the grinding wheel, with a diamond on which a number of pyramids have been polished, as described in British specification No. 655,720. Such a diamond would likewise be embedded in a bit 5, a depression being made on the shank in appropriate relation to the direction of the multiplicity of pyramidal edges in the same manner as described above for the single pyramid diamond.

The principle of using a diamond exclusively on its hard grain by means of my indexing mechanism can also be applied to a rough natural diamond. In this case the directions of hard grain having first been ascertained optically, the diamond is likewise embedded in a bit 5 and the depression on the shank of the bit made in appropriate relation to the directions of hard grain.

The drawings illustrate the combination of an indexing head with a straight shank using a downward tilt in a vertical plane. However the indexing head may also be used in other positions in relation to the grinding wheel, e. g. (a) underneath the grinding wheel in a base fixed on the table of a surface grinder, (b) with a drag angle in the horizontal plane or (c) against the side face of the grinding wheel.

The indexing mechanism according to the invention is foolproof and simple to operate. It enables a keen cutting edge to be maintained on the diamond throughout its working life and the diamond to be utilized in the most efficient crystallographic planes, thereby reducing wear of the diamond and very considerably increasing its working life.

What I claim as my invention and desire to secure by Letters Patent is:

1. A method of dressing a grinding wheel by means of a diamond-tipped dressing tool, which consists in periodically indexing the tool in relation to the wheel so that in all indexing positions the diamond is in contact with the wheel in a direction of hard grain forming an angle of between 30° and 45° to a crystal axis of the diamond.

2. A method of dressing a grinding wheel which comprises presenting to the wheel a tool tipped with a diamond having a polished pyramid, said pyramid having edges extending along the directions of hard grain of the diamond, and periodically indexing the tool in relation to the wheel to bring the diamond into contact with the wheel at successive positions all of which are in close proximity to an edge of said pyramid.

3. A method of dressing a grinding wheel which comprises presenting to the wheel a tool tipped with a diamond having a polished pyramid, said pyramid having convexly curved edges extending along the directions of hard grain of the diamond, and periodically indexing the tool in relation to the wheel to bring the diamond into contact with the wheel at successive positions all of which are in close proximity to an edge of said pyramid.

4. A method according to claim 2, wherein the diamond is brought into contact with the wheel at positions disposed on opposite sides of each successive edge of the pyramid and spaced at an angle of about 15° from said edge.

5. For use in trueing a grinding wheel, a tool comprising a shank, a bit mounted to rotate in relation to the shank, a diamond fixed to the bit and having thereon a polished pyramid, said pyramid having edges which extend along the directions of hard grain of the diamond and at 45° to the crystal axes of the diamond and indexing mechanism which is manually operable to adjust the bit in relation to the shank to certain predetermined positions only, the diamond being presented to the wheel in all of said positions in close proximity to an edge of said pyramid, said indexing mechanism including a notched member and a cooperating detent, one attached to the bit and the other to the shank, the notches in said notched member comprising pairs defining indexing positions spaced at an angle of about 15° on opposite sides of each edge of said pyramid.

6. A diamond, for use in dressing and trueing grinding wheels, having formed thereon a polished pyramid having four convexly curved edges extending along the directions of hard grain of the diamond and at 45° to the crystal axes thereof.

7. For use in trueing a grinding wheel, a tool comprising a shank, a bit mounted to rotate in relation to the shank, a diamond fixed to the bit and having thereon a polished pyramid, said pyramid having edges which extend along the directions of hard grain of the diamond and at 45° to the crystal axes of the diamond, and indexing mechanism which is manually operable to adjust the bit in relation to the shank to certain predetermined positions only, said indexing mechanism being arranged to present the diamond to the wheel at positions disposed on opposite sides of each successive edge of the pyramid and spaced at an angle of about 15° from said edge.

8. For use in trueing a grinding wheel, a tool comprising a shank, a bit mounted to rotate in relation to the shank, a diamond fixed to the bit and having thereon a polished pyramid, said pyramid having edges which extend along the directions of hard grain of the diamond and at 45° to the crystal axes of the diamond, and indexing mechanism which is manually operable to adjust the bit in relation to the shank to certain predetermined positions only, said indexing mechanism comprising two cooperating indexing members, one of said members being a notched member and the other a detent, one of said indexing members being attached to the rotatable bit and the other indexing member being attached to the fixed shank, a member mounted for rotation on the shank of the tool and a clutch between said rotatable member and the indexing member attached to the bit, said clutch being arranged to drive said indexing member to disengage the detent from a notch in the notched member when the rotatable member is rotated in one direction and to slip when the rotatable member is turned in the other direction and the detent has engaged one of said notches.

9. For use in trueing a grinding wheel, a tool comprising a shank, a bit mounted to rotate in relation to the shank, a diamond fixed to the bit and having thereon a polished pyramid, said pyramid having edges which extend along the directions of hard grain of the diamond and at 45° to the crystal axes of the diamond, and indexing mechanism which is manually operable to adjust the bit in relation to the shank to certain predetermined positions only, said indexing mechanism comprising a ratchet member attached to the rotatable bit and formed with notches spaced non-uniformly therein and defining the predetermined indexing positions, a detent cooperating with the notches and carried by the shank, a nut mounted to rotate on the shank and a clutch between the nut and the ratchet member, said clutch being effective on rotation of the nut in one direction to turn the bit and ratchet member and thereby to force the detent out of a notch in the ratchet member but slipping when the nut is rotated in the opposite direction and the detent has engaged in another notch in the ratchet member.

10. A diamond, for use in dressing and trueing grinding wheels, having formed thereon a pyramid having four edges extending along the directions of hard grain of the diamond and at 45° to the crystal axes thereof, the top of said pyramid being domed and said edges having convex curvature in said domed portion of the pyramid.

References Cited in the file of this patent

UNITED STATES PATENTS

| | | |
|---|---|---|
| 1,106,745 | Stevens | Aug. 11, 1914 |
| 1,400,614 | Lovejoy | Dec. 20, 1921 |
| 2,367,857 | Findlater | Jan. 23, 1945 |
| 2,587,172 | Koebel | Feb. 26, 1952 |
| 2,660,994 | Teather | Dec. 1, 1953 |

FOREIGN PATENTS

| | | |
|---|---|---|
| 497,114 | France | Aug. 30, 1919 |
| 556,675 | Great Britain | Oct. 15, 1943 |
| 626,893 | Great Britain | July 22, 1949 |

OTHER REFERENCES

Publication: Industrial Diamond Review, 1953, vol. 13, pp. 175–179, 182, 183; 1955, vol. 15, pp. 185–187, 191; articles by R. M. Denning.